US012769771B2

(12) United States Patent
Yoshimura et al.

(10) Patent No.: US 12,769,771 B2
(45) Date of Patent: Oct. 20, 2026

(54) IMAGE EXPLANATION SYSTEM, IMAGE ANALYSIS DEVICE, AND IMAGE EXPLANATION METHOD

(71) Applicant: Hitachi, Ltd., Tokyo (JP)

(72) Inventors: Kentaro Yoshimura, Tokyo (JP); Haruki Oishi, Tokyo (JP); Shigeru Ota, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 18/795,614

(22) Filed: Aug. 6, 2024

(65) Prior Publication Data

US 2025/0103626 A1 Mar. 27, 2025

(30) Foreign Application Priority Data

Sep. 26, 2023 (JP) ................................ 2023-162954

(51) Int. Cl.

| | |
|---|---|
| ***G06F 16/3329*** | (2025.01) |
| ***G06F 16/583*** | (2019.01) |
| ***G06V 20/40*** | (2022.01) |
| ***G06V 20/58*** | (2022.01) |
| ***H04W 4/029*** | (2018.01) |
| ***H04W 4/44*** | (2018.01) |

(52) U.S. Cl.

CPC ........ *G06F 16/3329* (2019.01); *G06F 16/583* (2019.01); *G06V 20/41* (2022.01); *G06V 20/58* (2022.01); *H04W 4/029* (2018.02); *H04W 4/44* (2018.02)

(58) Field of Classification Search

CPC ..... H04W 4/44; H04W 4/029; G06F 16/3329; G06F 16/583; G06V 20/58; G06V 20/41
See application file for complete search history.

(56) References Cited

U.S. PATENT DOCUMENTS 10,614,344 B2 * 4/2020 Anthony ......... B60W 60/00274
12,169,775 B2 * 12/2024 Lu ........................ G05D 1/0248
(Continued)

FOREIGN PATENT DOCUMENTS

CN 110857085 A * 3/2020 .............. H04W 4/46
CN 120851021 A * 10/2025 ............. G06V 10/82
(Continued)

OTHER PUBLICATIONS

Towards Language Models That Can See: Computer Vision Through the LENS of Natural Language (Year: 2023).*
(Continued)

*Primary Examiner* — Mohammad K Islam
(74) *Attorney, Agent, or Firm* — Volpe Koenig

(57) ABSTRACT

An explanatory sentence generation unit of a vehicle image analysis device specifies a scene shown in an image received from a camera, reads, from a necessity table, recognition necessity information on an object in the image for each specified scene, recognizes, from the image, an object designated as requiring recognition based on the read recognition necessity information, generates an explanatory sentence for each object based on a recognition result thereof, generates a situation explanatory sentence of the image based on the specified scene and the explanatory sentence for each object, and stores the situation explanatory sentence of the image and the image in an explanatory sentence DB in association with each other.

20 Claims, 14 Drawing Sheets

(56) References Cited

U.S. PATENT DOCUMENTS

| | | | | |
|---|---|---|---|---|
| 12,314,294 | B1* | 5/2025 | Browder | G06F 16/31 |
| 2018/0336424 | A1* | 11/2018 | Jang | G06N 3/044 |
| 2019/0382035 | A1 | 12/2019 | Li et al. | |
| 2020/0004257 | A1* | 1/2020 | Kim | B60W 60/0016 |
| 2020/0055515 | A1* | 2/2020 | Herman | G05D 1/0088 |
| 2020/0319647 | A1* | 10/2020 | Ha | G08G 1/096791 |
| 2021/0118442 | A1* | 4/2021 | Poddar | G06Q 10/40 |
| 2022/0083589 | A1* | 3/2022 | Ogata | G06F 16/5866 |
| 2024/0127600 | A1* | 4/2024 | Perez Barrera | G06V 20/58 |
| 2024/0378656 | A1* | 11/2024 | He | G06Q 30/0639 |
| 2024/0419830 | A1* | 12/2024 | Park | G06F 21/6254 |
| 2025/0117595 | A1* | 4/2025 | Taheri | G06F 40/40 |
| 2025/0190460 | A1* | 6/2025 | Madisetti | G06F 16/3329 |
| 2025/0291825 | A1* | 9/2025 | Park | G10L 15/26 |
| 2025/0298798 | A1* | 9/2025 | Kane | G06N 20/00 |
| 2025/0310585 | A1* | 10/2025 | Rangan | G06V 30/10 |
| 2025/0315458 | A1* | 10/2025 | Clancy | G06F 16/906 |
| 2025/0321987 | A1* | 10/2025 | Yuan | G06F 16/3329 |

FOREIGN PATENT DOCUMENTS

| | | | | | |
|---|---|---|---|---|---|
| JP | 2019-214320 | A | | 12/2019 | |
| JP | 2025162971 | A | * | 10/2025 | G06V 20/41 |
| KR | 102678183 | B1 | * | 6/2024 | G06V 30/19093 |
| KR | 102785215 | B1 | * | 3/2025 | G06Q 50/10 |
| KR | 20250042539 | A | * | 3/2025 | G06Q 50/10 |
| KR | 102875205 | B1 | * | 10/2025 | G06V 20/52 |
| WO | WO-2025186882 | A1 | * | 9/2025 | G06F 16/583 |
| WO | WO-2025227051 | A1 | * | 10/2025 | G06F 16/3329 |
| WO | WO-2025233699 | A1 | * | 11/2025 | G06F 16/3331 |
| WO | WO-2025260087 | A1 | * | 12/2025 | G06F 40/20 |

OTHER PUBLICATIONS

European Summons to attend Oral proceedings pursuant to Rule 115(1) EPC and Communication from the Examining Division issued on Jul. 2, 2025 for European Patent Application No. 24198483.0.

Extended European Search Report issued on Jan. 23, 2025 for European Patent Application No. 24198483.0.

Japanese Office Action issued on Jan. 6, 2026 for Japanese Patent Application No. 2023162954.

Minutes of Oral Proceedings issued on Apr. 14, 2026 for European Patent Application No. 24198483.0.

Decision to Refuse issued on Apr. 16, 2026 for European Patent Application No. 24198483.0.

* cited by examiner

FIG. 5

14A

| TRAFFIC SCENE/ EXPLANATION OBJECT | EXPRESSWAY | GENERAL ROAD | PARKING LOT | ... |
|---|---|---|---|---|
| PEDESTRIAN | REQUIRED/ NOT REQUIRED | REQUIRED/ REQUIRED | REQUIRED/ NOT REQUIRED | |
| BICYCLE | REQUIRED/ NOT REQUIRED | REQUIRED/ NOT REQUIRED | REQUIRED/ NOT REQUIRED | |
| AUTOMOBILE | REQUIRED/ REQUIRED | REQUIRED/ NOT REQUIRED | REQUIRED/ NOT REQUIRED | |
| CROSSWALK | NOT REQUIRED/- | REQUIRED/ NOT REQUIRED | NOT REQUIRED/ NOT REQUIRED | |
| TRAFFIC LIGHT | NOT REQUIRED/- | REQUIRED/ REQUIRED | NOT REQUIRED/ NOT REQUIRED | |
| LANE CHANGE PROHIBITION LINE | REQUIRED/ NOT REQUIRED | NOT REQUIRED/- | NOT REQUIRED/- | |
| TOLLGATE | REQUIRED/ NOT REQUIRED | NOT REQUIRED/- | NOT REQUIRED/- | |
| NOTE: RECOGNITION NECESSITY/EXPLANATION NECESSITY (FOR EXAMPLE: REQUIRED/NOT REQUIRED = RECOGNITION IS "REQUIRED"/EXPLANATION "IS NOT REQUIRED") | | | | |

FIG. 6

14B

| EXPLANATION OBJECT | DETAILED ITEM |
|---|---|
| PEDESTRIAN | LOCATION, COLOR OF CLOTHING, OPERATION |
| BICYCLE | LOCATION, COLOR, OPERATION |
| AUTOMOBILE | LOCATION, VEHICLE TYPE (PASSENGER VEHICLE, TRUCK, BUS, ETC.), COLOR, OPERATION |
| LANE CHANGE PROHIBITION LINE | LANE TYPE, COLOR |
| TOLLGATE | LOCATION |

FIG. 12

| ROW | QUESTION | ANSWER |
|---|---|---|
| A01 | WHERE IS THIS SCENE?<br>FOR EXAMPLE, ROAD, EXPRESSWAY, OR PARKING LOT? | EXPRESSWAY |
| A02 | PEDESTRIAN IS PRESENT IN THIS SCENE? | NO |
| A03 | PERSON WHO RIDES BICYCLE IS PRESENT IN THIS SCENE? | NO |
| A04 | ANOTHER VEHICLE IS PRESENT IN THIS SCENE? | YES |
| A05 | WHAT TYPE OF VEHICLE IS THIS? CAR, BUS, TRUCK, OR MOTORCYCLE? | TRUCK |
| A06 | WHAT IS COLOR OF VEHICLE? | WHITE |
| A07 | HOW DOES VEHICLE MOVE? | DRIVE |
| A08 | WHERE IS VEHICLE IN THIS SCENE? | ON ROAD |
| A09 | WHERE DOES VEHICLE MOVE FROM OR TO? | FORWARD |
| A10 | LANE IS PRESENT IN THIS SCENE? | YES |
| A11 | WHAT IS TYPE OF LANE IN THIS SCENE?<br>SOLID LINE? OR BROKEN LINE? | SOLID LINE |
| A12 | WHAT IS COLOR OF LANE IN THIS SCENE?<br>WHITE OR ORANGE? | ORANGE |
| A13 | THERE IS CHARGE FOR THIS SCENE? | NO |

FIG. 13

| ROW | QUESTION | ANSWER |
|---|---|---|
| B01 | WHERE IS THIS SCENE?<br>ROAD, EXPRESSWAY, OR PARKING LOT? | EXPRESSWAY |
| B02 | ANOTHER VEHICLE IS PRESENT IN THIS SCENE? | YES |
| B03 | WHAT TYPE OF VEHICLE IS THIS? CAR, BUS, TRUCK, OR MOTORCYCLE? | TRUCK |
| B04 | WHAT IS COLOR OF VEHICLE? | WHITE |
| B05 | HOW DOES VEHICLE MOVE? | DRIVE |
| B06 | WHERE IS VEHICLE IN THIS SCENE? | ON ROAD |
| B07 | WHERE DOES VEHICLE MOVE FROM OR TO? | FORWARD |
| B08 | LANE IS PRESENT IN THIS SCENE? | YES |
| B09 | WHAT IS TYPE OF LANE IN THIS SCENE?<br>SOLID LINE? OR BROKEN LINE? | SOLID LINE |
| B10 | WHAT IS COLOR OF LANE IN THIS SCENE?<br>WHITE OR ORANGE? | ORANGE |

FIG. 16

| ROW | QUESTION | ANSWER |
|---|---|---|
| B01 | WHEN VEHICLE TRAVELS? | NOON |
| B02 | WHICH ROAD VEHICLE TRAVELS? | METROPOLITAN EXPRESSWAY NO. 5 |
| B03 | WHAT IS TRAVELING SPEED OF VEHICLE? | HIGH SPEED |
| B04 | VEHICLE ACCELERATES OR DECELERATES? | DECELERATES |
| B05 | VEHICLE TURNS? | STRAIGHT TRAVELING |

FIG. 17

| ROW | INSTRUCTION SENTENCE |
|---|---|
| C01 | PLEASE DESCRIBE TRAFFIC SITUATION SENTENCE AS TEXT INFORMATION FOR DRIVER OF VEHICLE BASED ON FOLLOWING DESCRIPTION BASED ON VIDEO FROM VEHICLE. |
| C02 | PLEASE CONCENTRATE ON PROVIDING TRAFFIC SITUATION. |
| C03 | PLEASE DO NOT GIVE DRIVING ADVICE TO DRIVER. |
| C04 | EXAMPLE SENTENCE IS "YOU ARE DRIVING ON EXPRESSWAY CURRENTLY AND APPROACHING INTERSECTION. BLUE TRUCK IS PRESENT IN LEFT TRAVELING LANE IN FRONT OF YOU." |

| ROW | QUESTION | ANSWER |
|---|---|---|
| D01 | WHEN VEHICLE TRAVELS? | NIGHT |
| D02 | WHICH ROAD VEHICLE TRAVELS? | MITO CITY |
| D03 | WHAT IS TRAVELING SPEED OF VEHICLE? | LOW SPEED |
| D04 | VEHICLE ACCELERATES OR DECELERATES? | STABLE |
| D05 | VEHICLE TURNS? | TURN LEFT |
| D06 | WHERE IS THIS SCENE? ROAD, EXPRESSWAY, OR PARKING LOT? | STREET |
| D07 | PEDESTRIAN IS PRESENT IN THIS SCENE? | NO |

IMAGE EXPLANATION SYSTEM, IMAGE ANALYSIS DEVICE, AND IMAGE EXPLANATION METHOD

BACKGROUND OF THE INVENTION

1. Field of the Invention

The present invention relates to an image explanation system, an image analysis device, and an image explanation method.

2. Description of Related Art

In the related art, a technique referred to as image caption generation has been disclosed, in which an image or a video is recognized and an explanatory sentence of the image or the video is generated (for example, PTL 1).

In the technique disclosed in PTL 1, a surrounding object reflected in an image from an in-vehicle camera is recognized, and a text including a positional relationship between a vehicle and the surrounding object is output to be provided as a surrounding situation explanatory sentence.

CITATION LIST

Patent Literature

PTL 1: JP2019-214320A

SUMMARY OF THE INVENTION

However, in a related-art technique such as in PTL 1, no system is provided which is suitable for an application of creating a database of vehicle images collected from connected cars, and searching for an image matching instruction conditions in a natural language by a user from the database. When constructing such an image database, it is desirable that each image in the database is associated with an explanatory sentence of the image in advance, and an explanatory sentence in the database similar to a search sentence input by the user is given.

On the other hand, in the related-art technique such as in PTL 1, no particular consideration is given to generating a natural surrounding situation explanatory sentence similar to the search sentence input by the user. For example, an object in an image is detected and a name of the object is simply used as an explanatory sentence, and presence or absence of a surrounding object to be focused on according to a traffic scene in which the vehicle is placed may not be mentioned in the explanatory sentence. As a result, it is impossible to match the search sentence input by the user.

The invention has been made in consideration of such circumstances, and a main object thereof is to create a database of images associated with natural explanatory sentences matching a search sentence input by a human.

In order to solve the problems described above, an image explanation system of the invention has the following features.

The invention provides an image explanation system including:

- a camera mounted on a vehicle and configured to capture an image; and
- a vehicle image analysis device configured to generate a situation explanatory sentence of the image captured by the camera, in which the vehicle image analysis device includes an explanatory sentence generation unit, and the explanatory sentence generation unit

- specifies a scene shown in the image received from the camera, and reads, from a necessity table, recognition necessity information on an object in the image for each specified scene,
- recognizes, from the image, an object designated as requiring recognition based on the read recognition necessity information, and generates an explanatory sentence for each object based on a recognition result thereof, and
- generates the situation explanatory sentence of the image based on the specified scene and the explanatory sentence for each object, and stores the situation explanatory sentence of the image and the image in an image database in association with each other.

Other features will be described later.

According to the invention, it is possible to create a database of images associated with natural explanatory sentences matching a search sentence input by a human.

BRIEF DESCRIPTION OF THE DRAWINGS

FIG. 5 is a configuration diagram of a necessity table according to the present embodiment;

FIG. 6 is a configuration diagram of a recognition table according to the present embodiment;

FIG. 12 is a table showing intermediate data as a result of executing the image explanatory sentence generation process on the still image data in FIG. 3 according to the present embodiment;

FIG. 13 is a table showing output data as a result of the explanatory sentence generation unit deleting unnecessary data from the intermediate data in FIG. 12 according to the present embodiment;

FIG. 16 is a table showing an example of an explanatory sentence generated in FIGS. 14 and 15 according to the present embodiment;

FIG. 17 is a table showing an instruction sentence to a large-scale language model unit used in a traveling situation explanatory sentence generation process according to the present embodiment;

DESCRIPTION OF EMBODIMENTS

Hereinafter, an embodiment of the invention will be described with reference to the drawings.

Figure 1:
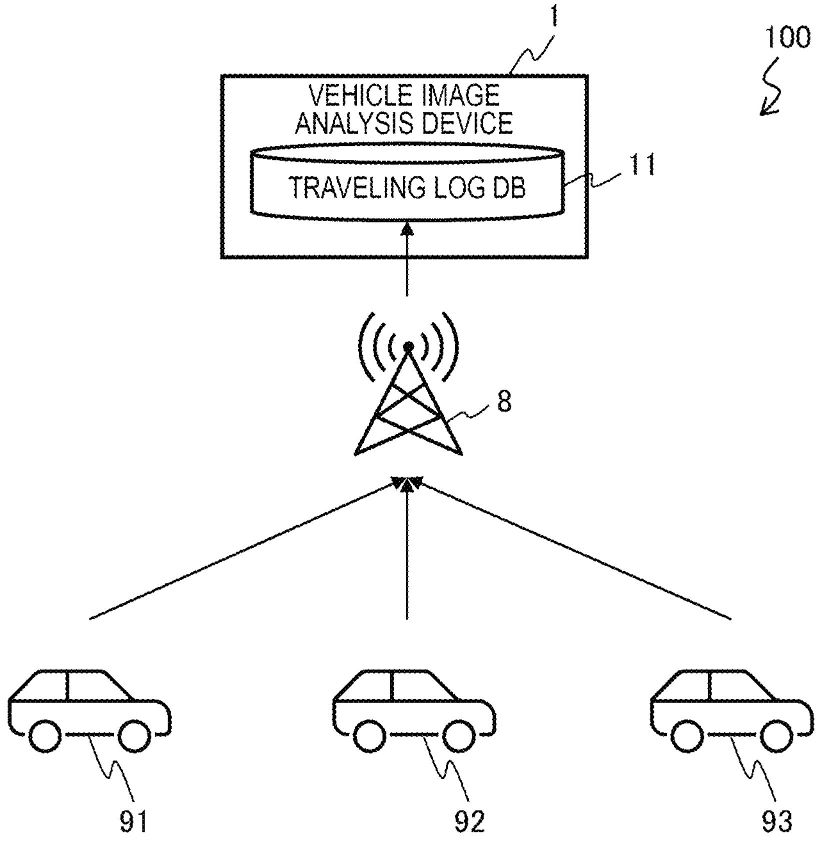
FIG. 1 is a configuration diagram of an image explanation system according to the present embodiment.

FIG. 1 is a configuration diagram of an image explanation system 100.

In the image explanation system 100, vehicles 91 to 93 are present as vehicles (connected cars) that can communicate with a vehicle image analysis device 1 via a communication line 8. Each of the vehicles 91 to 93 transmits various types of measurement data measured by the own vehicle to a traveling log DB 11 of the vehicle image analysis device 1 via the communication line 8.

Each of the vehicles 91 to 93 is mounted with an in-vehicle camera that captures an image. The vehicle image analysis device 1 generates a situation explanatory sentence of an image captured by the in-vehicle camera.

As the communication line 8, a general public line network, for example, a fifth-generation mobile communication system, so-called 5th Generation (5G) that enables "multiple concurrent connections" and "ultra-low delay" can be used regardless of whether it is wired or wireless. Further, by taking advantage of features of a new mobile telephone system in or after 5G, effects such as generating online (real-time while traveling) explanatory sentence can also be expected.

Figure 2:
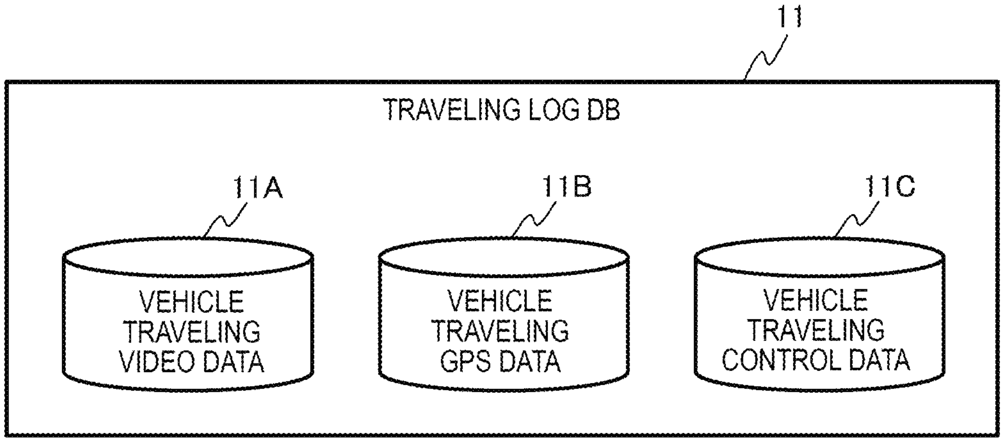
FIG. 2 is a diagram showing details of a traveling log DB according to the present embodiment.

FIG. 2 is a diagram showing details of the traveling log DB 11.

The traveling log DB 11 stores the measurement data from the vehicles 91 to 93 by types of data as follows.

- Vehicle traveling video data 11A that is video data imaged by the in-vehicle camera (not shown) during traveling or stopping of a vehicle
- Vehicle traveling GPS data 11B that is in-vehicle global positioning system (GPS) data
- Vehicle traveling control data 11C that is control data of the vehicle such as a speed, an acceleration and deceleration, and a steering angle as vehicle traveling log data obtained from an in-vehicle electronic control unit (ECU) or the like The GPS is an example of a satellite positioning system.

Figure 3:
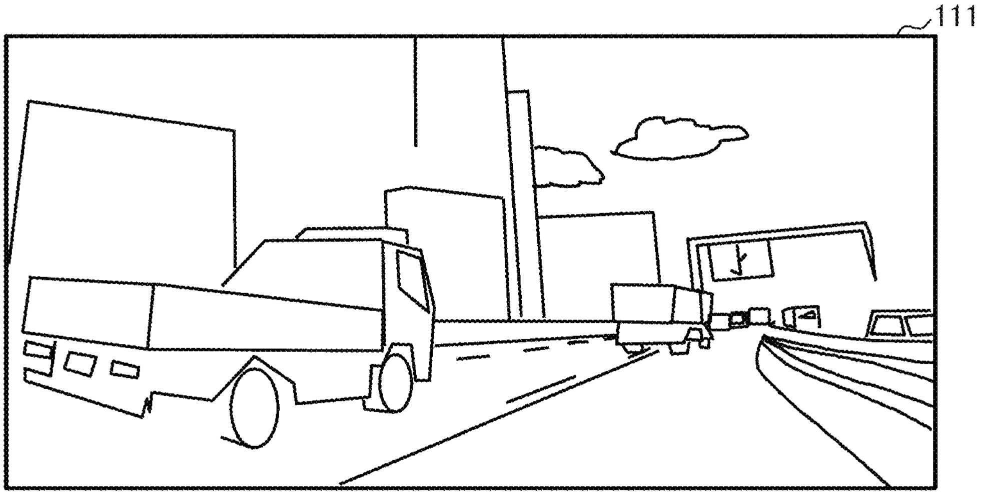
FIG. 3 is a diagram showing an example of still image data that is a part of vehicle traveling video data according to the present embodiment.

FIG. 3 is a diagram showing an example of still image data 111 that is a part of the vehicle traveling video data 11A.

The still image data 111 is an example of data extracted from the vehicle traveling video data 11A obtained by imaging the vehicles 91 to 93 that travel on an expressway.

Figure 4:
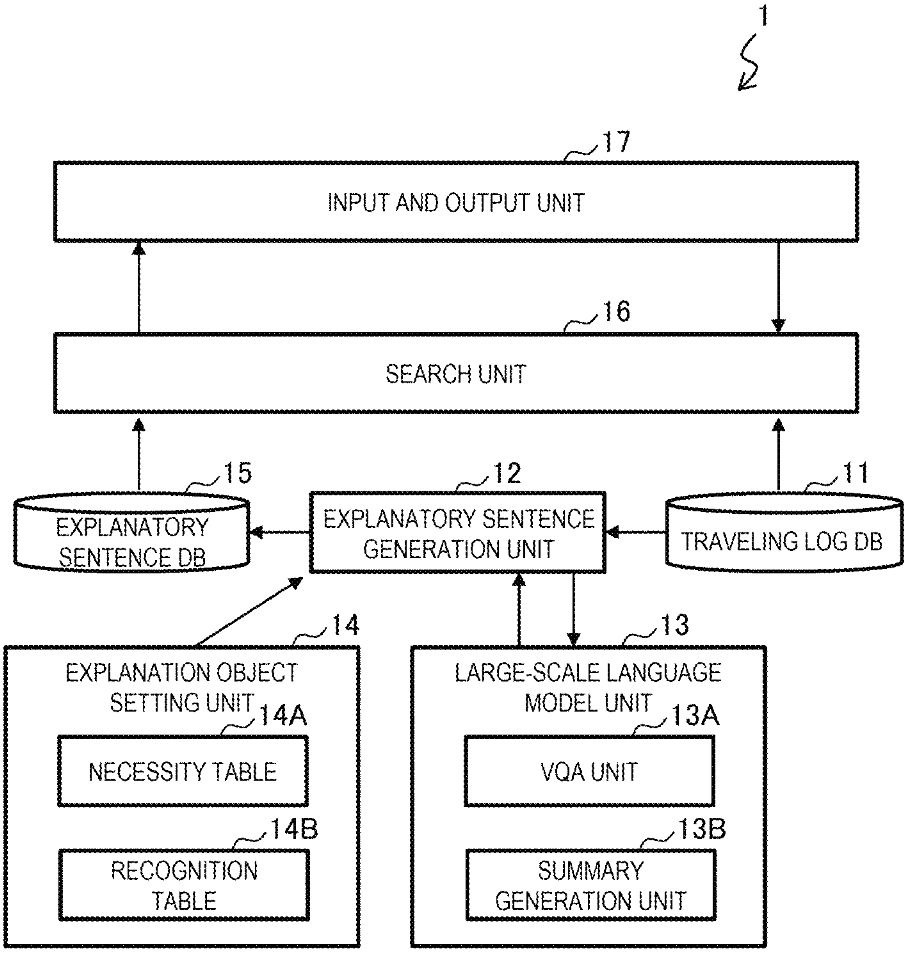
FIG. 4 is a configuration diagram of a vehicle image analysis device according to the present embodiment.

FIG. 4 is a configuration diagram of the vehicle image analysis device 1.

The vehicle image analysis device 1 includes an explanatory sentence generation unit 12, a large-scale language model unit 13, an explanation object setting unit 14, an explanatory sentence DB (image database) 15, a search unit 16, and an input and output unit 17 in addition to the traveling log DB 11 explained in FIG. 2. The explanation object setting unit 14 includes a necessity table 14A and a recognition table 14B. The large-scale language model unit 13 includes a visual question answer (VQA) unit 13A and a summary generation unit 13B.

The various types of data stored in the vehicle image analysis device 1 (the traveling log DB 11, the necessity table 14A, and the recognition table 14B) may be stored in a storage device (not shown) outside the vehicle image analysis device 1, and may be accessible from the vehicle image analysis device 1 via a network from the storage device.

The explanatory sentence generation unit 12 analyzes a traveling situation of each vehicle by using the large-scale language model unit 13 and the explanation object setting unit 14 based on data in the traveling log DB 11, and generates a natural sentence for explaining the traveling situation of the vehicle according to an analysis result. Therefore, the explanatory sentence generation unit 12 analyzes whether the traveling situation of the vehicle corresponds to any one of pre-classified traffic scenes.

The large-scale language model unit 13 is called out by the explanatory sentence generation unit 12. The large-scale language model unit 13 is implemented by a language vision (LAVIS) or the like that uses a natural language conversation method as an interface to exchange a question sentence and an answer sentence, and includes the following processing units.

- The VQA unit 13A gives an answer in a natural sentence to an inquiry about an image in a natural sentence. Therefore, when an image recognition model such as a convolutional neural network (CNN) is prepared by using training data or the like in advance, and an inquiry sentence is input to the image recognition model, the VQA unit 13A obtains an explanatory sentence of a corresponding image.
- The summary generation unit 13B gives an answer, as a traffic situation explanatory sentence, by a summary sentence obtained by summarizing contents of a received natural sentence (prompt) (integrating a plurality of sentences). The summary generation unit 13B may use an existing service, for example, GPT-4, CLIP, BLIP, or BLIP-2 as a text generation AI service in which a summary process, a translation process, and the like are performed.

The explanation object setting unit 14 refers to the following tables to set an explanation object corresponding to a traffic scene in the explanatory sentence generation unit 12, and stores the explanation object in the explanatory sentence DB 15.

- In the necessity table 14A (FIG. 5), an explanation object is associated with each traffic scene, and a degree of importance of whether to mention an explanatory sentence for an individual explanation object is defined.
- In the recognition table 14B (FIG. 6), detailed contents to be mentioned in an explanatory sentence are defined for an individual explanation object.

The explanatory sentence DB 15 stores a traveling situation explanatory sentence generated by the explanatory sentence generation unit 12.

In this way, the explanatory sentence generation unit 12 executes the following (Process 1) to (Process 3).

(Process 1) A scene shown in an image received from a camera is specified, and recognition necessity information on an object in the image is read from the necessity table 14A for each specified scene.

(Process 2) An object designated as requiring recognition based on the read recognition necessity information is recognized from the image, and an explanatory sentence for each object is generated based on the recognition result.

(Process 3) A situation explanatory sentence of the image is generated based on the specified scene and the explanatory sentence for each object, and the situation explanatory sentence of the image and the image are stored in the explanatory sentence DB 15 in association with each other.

FIG. 5 is a configuration diagram of the necessity table 14A. The explanation object setting unit 14 sets an explanation object for each traffic scene such as an expressway, a general road, and a parking lot.

For example, a combination of "expressway" as the traffic scene and "automobile" as the explanation object corresponds to "required/required". The "required" in the recognition necessity information on a left side of the "required/required" expression indicates that it is necessary to recognize an explanation object from an image. In addition, the "required" in explanation necessity information on a right side of the "required/required" expression indicates that it is necessary to give an explanation in an explanatory sentence for an explanation object recognized or not recognized from the image.

Therefore, in "general road" as the traffic scene, recognition of a pedestrian is "required". Even when the pedestrian is not recognized, it is set that an explanation is "required". On the other hand, in the "general road" as the traffic scene, recognition of a crosswalk is "required", but an explanation thereof is not required.

In this way, when explanation necessity information on an object in an image is read from the necessity table 14A, and an object designated as requiring an explanation in the read explanation necessity information cannot be recognized from the image, the explanatory sentence generation unit 12 generates an explanatory sentence indicating that the object is absent in the image as the explanatory sentence for each object.

Accordingly, according to a traffic scene in which a vehicle travels, an explanatory sentence can be generated only when an object normally absent in many cases is present, and an explanatory sentence can also be generated when an object normally present in many cases is absent. Therefore, there is an effect that a more natural traffic situation explanatory sentence can be generated, and search accuracy for a search sentence by a user is improved.

FIG. 6 is a configuration diagram of the recognition table 14B. In the recognition table 14B, an item to be analyzed using the VQA unit 13A and an item to include an analysis result in an explanatory sentence are defined as detailed items for a recognized explanation object.

For example, when a pedestrian is recognized, the VQA unit 13A analyzes a location, a color of clothing, and an operation thereof.

In this way, the explanatory sentence generation unit 12 reads detailed items of an object in an image from the recognition table 14B, and generates, as the explanatory sentence for each object, an explanatory sentence of the read detailed items of the object recognized from the image. Accordingly, information to be added by an explanation object can be individually set, and a natural traffic situation explanatory sentence can be generated. Therefore, the search accuracy for the search sentence by the user is improved.

Figure 7:
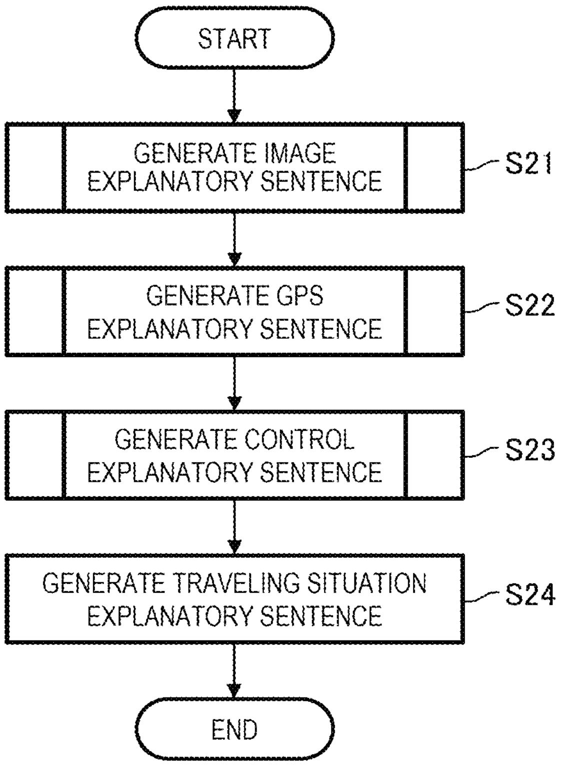
FIG. 7 is a flowchart of an explanatory sentence generation unit according to the present embodiment.

FIG. 7 is a flowchart of the explanatory sentence generation unit 12.

As an image explanatory sentence generation process (S21), the explanatory sentence generation unit 12 generates an image explanatory sentence by causing the VQA unit 13A to execute image analysis on the still image data 111 extracted from the vehicle traveling video data 11A. The process of extracting the still image data 111 is, for example, a process of extracting continuously captured images at a certain interval such as every 10 seconds, or extracting 10 images from a video file at an equal time interval.

As a GPS explanatory sentence generation process (S22), the explanatory sentence generation unit 12 generates a GPS explanatory sentence based on the vehicle traveling GPS data 11B. At this time, GPS data having a same time point as or GPS data having a closest time point to the still image data 111 in S21 is adopted as target GPS data (positioning data).

That is, the explanatory sentence generation unit 12 adds, to the situation explanatory sentence of the image, an explanatory sentence related to at least one piece of information of information on a time period during image capturing and information on a traveling position during the image capturing based on the GPS data read from the in-vehicle GPS of the vehicle 91.

As a control explanatory sentence generation process (S23), the explanatory sentence generation unit 12 generates a control explanatory sentence based on the vehicle traveling control data 11C. At this time, control data having a same time point as or closest to the still image data 111 in S21 is adopted as target control data.

That is, the explanatory sentence generation unit 12 adds, to the situation explanatory sentence of the image, an explanatory sentence related to at least one piece of information of speed information, acceleration and deceleration information, and steering angle information based on the vehicle traveling control data 11C read from the in-vehicle electronic control unit (ECU) of the vehicle 91.

As a traveling situation explanatory sentence generation process (S24), the explanatory sentence generation unit 12 generates a traveling situation explanatory sentence by causing the summary generation unit 13B to summarize the image explanatory sentence generated in S21, the GPS explanatory sentence generated in S22, and the control explanatory sentence generated in S23. The explanatory sentence generation unit 12 associates the generated traveling situation explanatory sentence and the still image data 111 that is an explanation object of the traveling situation explanatory sentence with each other, and stores the associated data in the explanatory sentence DB 15.

That is, the summary generation unit 13B generates a summary sentence according to a received prompt. Then, the explanatory sentence generation unit 12 generates the situation explanatory sentence of the image when a prompt including a generation instruction sentence of a situation explanatory sentence based on information included in the situation explanatory sentence, information excluded from the situation explanatory sentence, and information on an example sentence of the situation explanatory sentence and an explanatory sentence for each object is input to the summary generation unit 13B.

Figure 8:
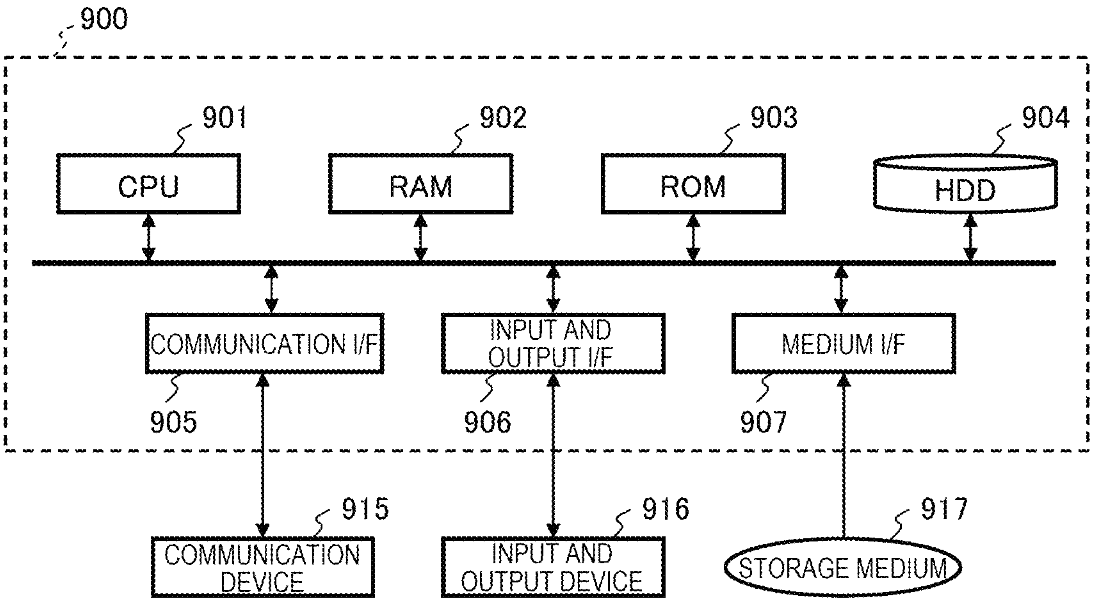
FIG. 8 is a hardware configuration diagram of the vehicle image analysis device according to the present embodiment.

FIG. 8 is a hardware configuration diagram of the vehicle image analysis device 1.

The vehicle image analysis device 1 is implemented as a computer 900 including a CPU 901, a RAM 902, a ROM 903, an HDD 904, a communication I/F 905, an input and output I/F 906, and a medium I/F 907.

The communication I/F 905 is connected to an external communication device 915. The input and output I/F 906 is connected to an input and output device 916. The medium I/F 907 reads and writes data from and to a storage medium 917. Further, the CPU 901 improves control of the processing units by executing a program (also referred to as an application, or abbreviated as APP) read into the RAM 902. The program can also be distributed via a communication line, or be distributed by being stored in the storage medium 917 such as a CD-ROM.

Figure 9:
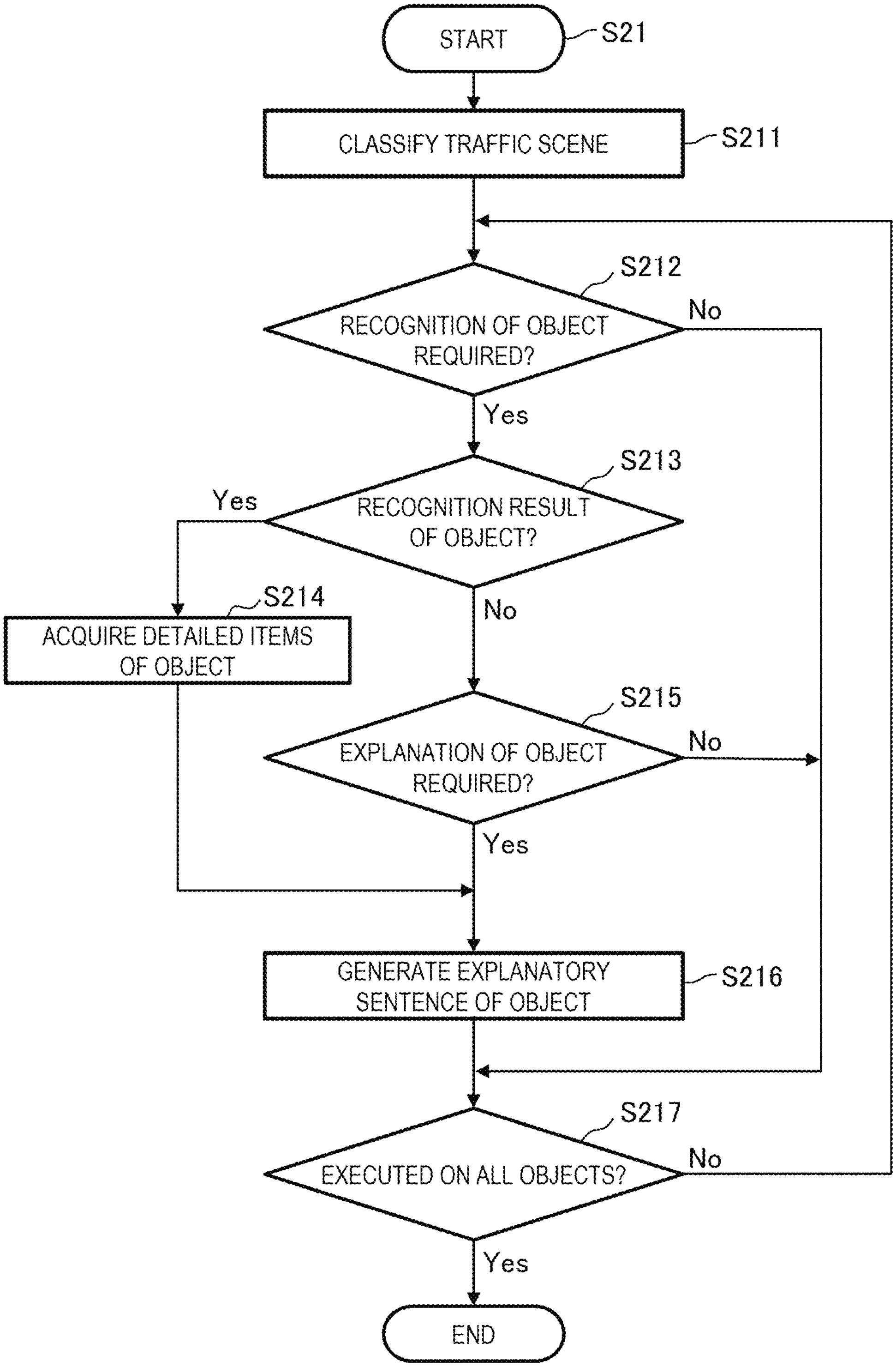
FIG. 9 is a detailed flowchart of an image explanatory sentence generation process according to the present embodiment.

FIG. 9 is a detailed flowchart of the image explanatory sentence generation process (S21 in FIG. 7).

The explanatory sentence generation unit 12 classifies traffic scenes shown in the still image data 111 by making an inquiry to the VQA unit 13A (S211). The VQA unit 13A receives an input of the still image data 111 and an inquiry sentence regarding the traffic scene (for example, "where is this scene? for example, road, expressway, or parking lot?"), and responds to the explanatory sentence generation unit 12 with an answer sentence (for example, expressway) (Row A01 in FIG. 12). Since the explanatory sentence generation unit 12 reads the inquiry sentence regarding the traffic scene set in the vehicle image analysis device 1 by an administrator in advance, a user of the vehicle image analysis device 1 does not need to generate the inquiry sentence regarding the traffic scene by himself/herself.

Hereinafter, the explanatory sentence generation unit 12 executes a loop process in S212 to S217 by sequentially selecting explanation objects (a pedestrian, a bicycle, an automobile, and the like) registered in the necessity table 14A. Hereinafter, the explanation objects selected in the current loop process are set as selected objects.

The explanatory sentence generation unit 12 determines whether recognition of a selected object is required in the traffic scene specified in S211 with reference to the necessity table 14A (S212). In a case of Yes (required) in S212, the process proceeds to S213, and in a case of No, the process proceeds to S217.

The explanatory sentence generation unit 12 inquires whether the selected object is present in the still image data 111 of the VQA unit 13A of the large-scale language model unit 13. This inquiry sentence is, for example, "pedestrian is present in this scene?" (Row A02 in FIG. 12). The explanatory sentence generation unit 12 recognizes an object designated as requiring recognition from the image based on an answer sentence to the inquiry sentence (a recognition result of the object). As the recognition result, the explanatory sentence generation unit 12 determines whether the selected object is present in the still image data 111 (S213). In a case of Yes (present) in S213, the process proceeds to S214, and in a case of No, the process proceeds to S215.

The explanatory sentence generation unit 12 acquires detailed items of the selected object present in the still image data 111 (S214). Therefore, the explanatory sentence generation unit 12 acquires the detailed items corresponding to the selected object with reference to the recognition table 14B. Then, the explanatory sentence generation unit 12 inquires the detailed items of the selected object in the still image data 111 one by one of the VQA unit 13A of the large-scale language model unit 13. For example, since the selected object=automobile, and "color" is included in detailed items corresponding to the automobile in the recognition table 14B, the explanatory sentence generation unit 12 generates an inquiry sentence indicating that "what is color of vehicle?"

The explanatory sentence generation unit 12 determines whether explanation (mention) of the selected object is required with reference to the necessity table 14A (S215). In a case of Yes (required) in S215, the process proceeds to S216, and in a case of No, the process proceeds to S217.

The explanatory sentence generation unit 12 generates an explanatory sentence of the selected object by any one of the following (S216).

Figures 18, 19:
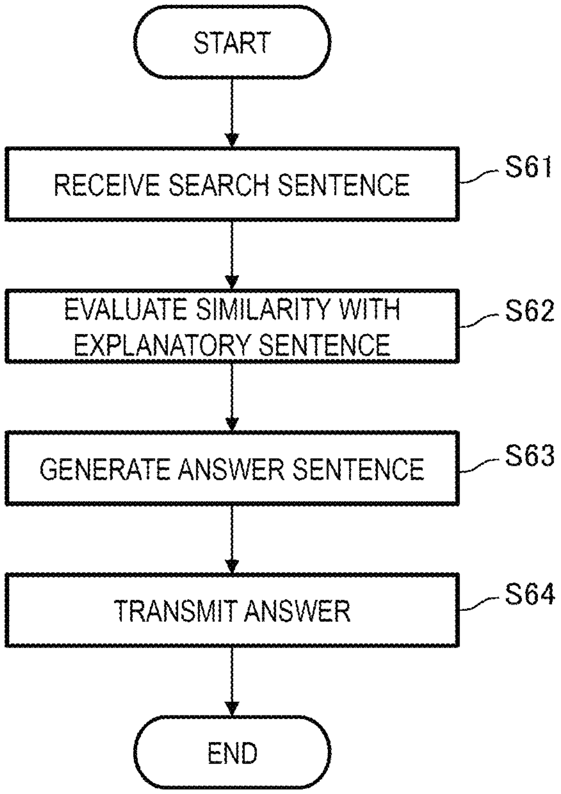
FIG. 18 is a table showing an example of the image explanatory sentence generated from an image different from that in FIG. 13 according to the present embodiment.
FIG. 19 is a flowchart showing a process of a search unit according to the present embodiment.

- In the case of Yes in S213, the explanatory sentence of the selected object is generated based on a combination of the inquiry sentence of the detailed items of the selected object acquired in S214 and an answer sentence thereof.
- In the case of No in S213, an explanatory sentence of the selected object indicating that the selected object is not recognized in the still image data 111 is generated (Row D07 in FIG. 18, and the like).

When the process on the current selected object is ended, the explanatory sentence generation unit 12 determines whether processes on all the selected objects are completed (S217). In a case of Yes (completed) in S217, the process is ended, and in a case of No, the process is returned to S212 by switching the current selected object to an unprocessed selected object.

Accordingly, it is possible to generate a natural traffic situation explanatory sentence including an explanation for surrounding objects to be interested and confirmed according to a traffic scene in which the vehicle travels, and the search accuracy for the search sentence by the user is improved.

Figure 10:
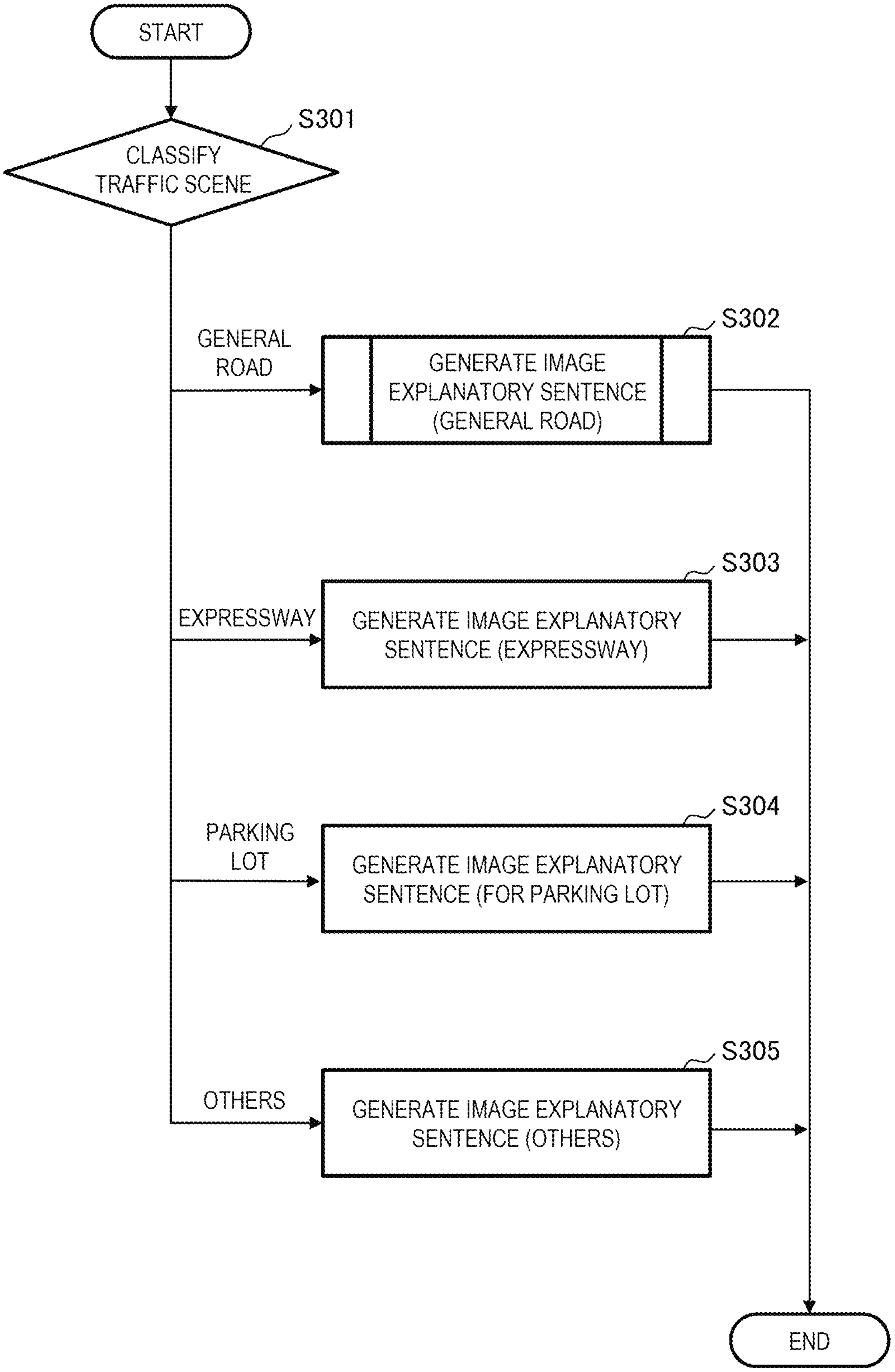
FIG. 10 is a flowchart showing an example of a specific operation of the image explanatory sentence generation process explained in FIG. 9 according to the present embodiment.

FIG. 10 is a flowchart showing an example of a specific operation of the image explanatory sentence generation process explained in FIG. 9.

According to a result of the process (S211 in FIG. 9) of classifying the traffic scenes shown in the still image data 111, the explanatory sentence generation unit 12 executes a process for a corresponding traffic scene as follows (S301).

- In a case of a classification result of a general road, a general road image explanatory sentence is generated (S302).
- In a case of a classification result of an expressway, an expressway image explanatory sentence is generated (S303).
- In a case of a classification result of a parking lot, a parking lot image explanatory sentence is generated (S304).
- In a case of other classification results, image explanatory sentences defined as other uses are generated (S305).

Figure 11:
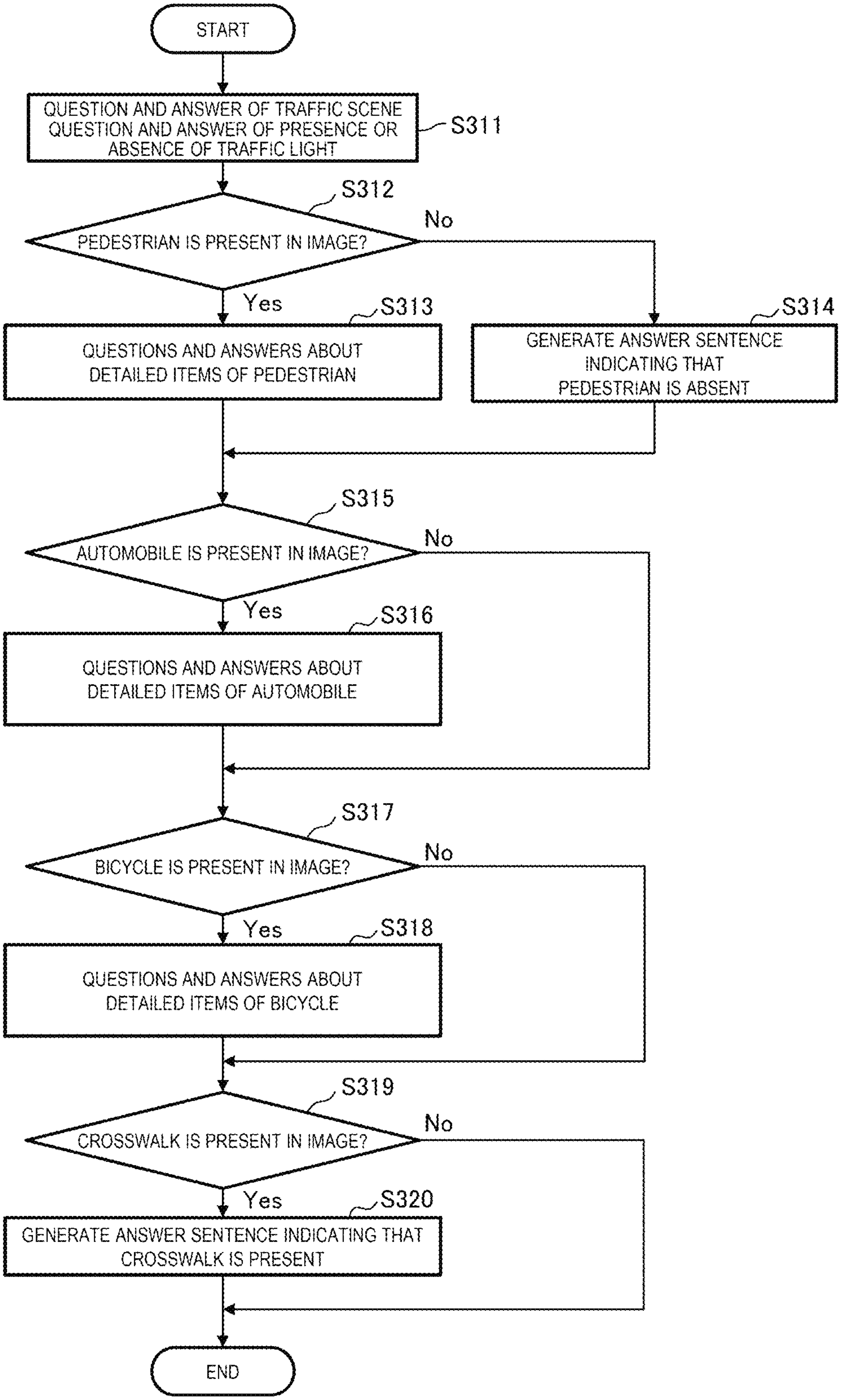
FIG. 11 is a detailed flowchart of a general road image explanatory sentence generation process according to the present embodiment.

FIG. 11 is a detailed flowchart of the general road image explanatory sentence generation process (S302 in FIG. 10).

The explanatory sentence generation unit 12 generates a question sentence and an answer sentence regarding a traffic scene (S211 in FIG. 9), and a question sentence and an answer sentence regarding presence or absence of a traffic light (S311).

As the determination process (S213) in FIG. 9, the explanatory sentence generation unit 12 inquires whether a pedestrian is present in an image (S312), proceeds to S313 when the pedestrian is present, and proceeds to S314 when the pedestrian is absent.

As questions and answers about detailed items of the pedestrian (S214 in FIG. 9), the explanatory sentence generation unit 12 generates an answer sentence indicating that the pedestrian is present, a question sentence and an answer sentence regarding a location of the pedestrian, a question sentence and an answer sentence regarding a color of clothing of the pedestrian, and a question sentence and an answer sentence regarding an operation of the pedestrian (S313).

The explanatory sentence generation unit 12 generates an answer sentence indicating that the pedestrian is absent (S314).

As the determination process (S213) in FIG. 9, the explanatory sentence generation unit 12 inquires whether an automobile is present in the image (S315), proceeds to S316 when the automobile is present, and proceeds to S317 when the automobile is absent.

As questions and answers about detailed items of the automobile (S214 in FIG. 9), the explanatory sentence generation unit 12 generates an answer sentence indicating that the automobile is present, a question sentence and an answer sentence regarding a location of the automobile, a question sentence and an answer sentence regarding a vehicle type of the automobile, a question sentence and an answer sentence regarding a color of the automobile, and a question sentence and an answer sentence regarding an operation of the automobile (S316).

As the determination process (S213) in FIG. 9, the explanatory sentence generation unit 12 inquires whether a bicycle is present in the image (S317), proceeds to S318 when the bicycle is present, and proceeds to S319 when the bicycle is absent.

As questions and answers about detailed items of the bicycle (S214 in FIG. 9), the explanatory sentence generation unit 12 generates an answer sentence indicating that the bicycle is present, a question sentence and an answer sentence regarding a location of the bicycle, a question sentence and an answer sentence regarding a color of the bicycle, and a question sentence and an answer sentence regarding an operation of the bicycle (S318).

As the determination process (S213) in FIG. 9, the explanatory sentence generation unit 12 inquires whether a crosswalk is present in the image (S319), proceeds to S320 when the crosswalk is present, and ends the process when the crosswalk is absent. The explanatory sentence generation unit 12 generates an answer sentence indicating that the crosswalk is present (S320).

The general road image explanatory sentence generation process has been explained above in FIG. 10, but the same also applies to processes (S303 to S305) of generating image explanatory sentences for other traffic scenes.

FIG. 12 is a table showing intermediate data as a result of executing the image explanatory sentence generation process (S21) on the still image data 111 in FIG. 3.

In the table, an image explanatory sentence is implemented by a combination of a question sentence and an answer sentence to the question sentence for each row.

For example, Row A01 is a result of the process (S211) of classifying the traffic scenes.

Rows A02 to A04 are results of the process (S213) of determining whether a selected object is present in the still image data 111.

Rows A05 to A13 are results of the process (S214) of acquiring detailed items of a selected object.

FIG. 13 is a table showing output data as a result of the explanatory sentence generation unit 12 deleting unnecessary data from the intermediate data in FIG. 12. As a difference from FIG. 12, an explanatory sentence regarding the pedestrian (Row A02), an explanatory sentence regarding the bicycle (Row A03), and an explanatory sentence regarding a tollgate (Row A13) whose explanations are not required when not recognized in the necessity table 14A of the explanation object setting unit 14 are deleted in FIG. 13.

Figure 14:
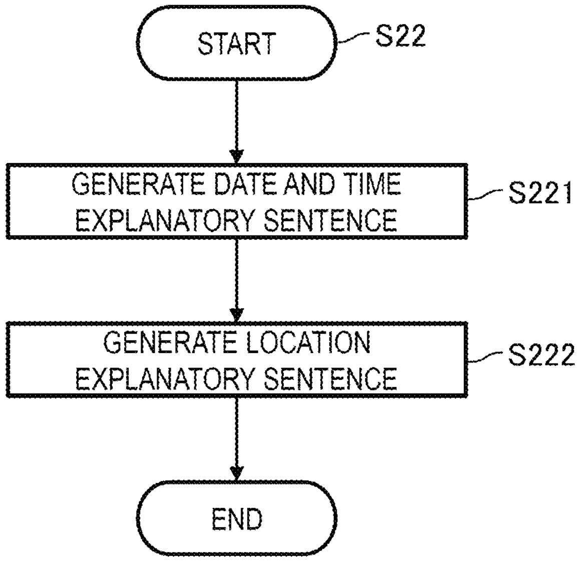
FIG. 14 is a flowchart showing details of a GPS explanatory sentence generation process according to the present embodiment.

FIG. 14 is a flowchart showing details of the GPS explanatory sentence generation process (S22).

The explanatory sentence generation unit 12 generates an explanation in which an imaging time point for the still image data 111 is classified into morning, daytime, evening, night, and the like according to a time period of GPS information obtained from the vehicle traveling GPS data 11B (S221).

The explanatory sentence generation unit 12 generates an explanation in which an imaging location of the still image data 111 is specified as a major road or a city name according to longitude and latitude of the GPS information obtained from the vehicle traveling GPS data 11B (S222).

Accordingly, it is possible to generate a traffic situation explanatory sentence including the information on the traveling time period and the traveling location of the vehicle. Therefore, the search accuracy for the search sentence by the user is improved.

Figure 15:
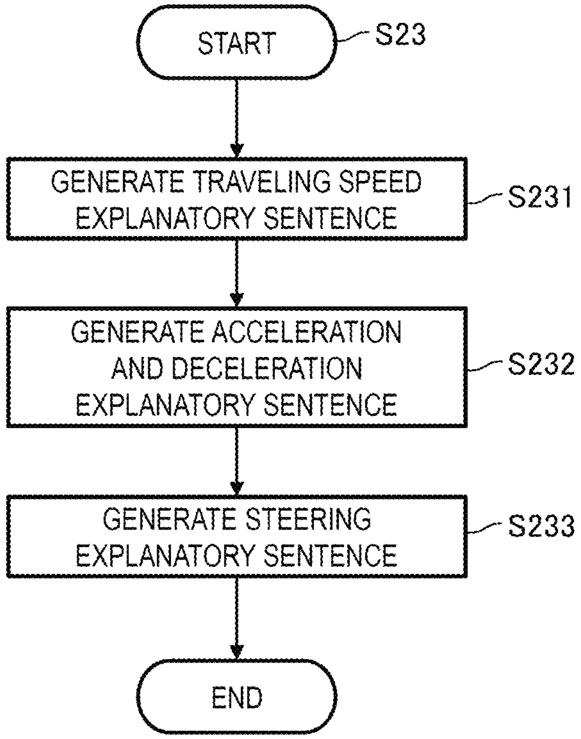
FIG. 15 is a flowchart showing details of a control explanatory sentence generation process according to the present embodiment.

FIG. 15 is a flowchart showing details of the control explanatory sentence generation process (S23).

The explanatory sentence generation unit 12 generates an explanatory sentence related to traveling speed control based on the vehicle traveling control data 11C (S231). The explanatory sentence is, for example, a low speed of 20 km/h or less, a medium speed of 20 km/h to 60 km/h, and a high speed of 60 km/h or more.

The explanatory sentence generation unit 12 generates an explanatory sentence related to acceleration and deceleration control based on the vehicle traveling control data 11C (S232). The explanatory sentence is, for example, an acceleration state in a case of acceleration equal to or larger than a predetermined value, a deceleration state in a case of deceleration equal to or larger than a predetermined value, and a constant-speed state otherwise.

The explanatory sentence generation unit 12 generates an explanatory sentence related to steering control based on the vehicle traveling control data 11C (S233). The explanatory sentence is, for example, a left-turn state or a right-turn state in a case of a steering angle equal to or larger than a predetermined value, and a straight traveling state in other cases.

Accordingly, it is possible to generate a more natural traffic situation explanatory sentence including an explanation related to a control state and behavior of the vehicle. Therefore, there is an effect that the search accuracy for the search sentence by the user is improved.

FIG. 16 is a table showing an example of an explanatory sentence generated in FIGS. 14 and 15.

In Row B01, an explanatory sentence regarding a time period is generated in S221.

In Row B02, an explanatory sentence regarding a traveling location is generated in S222.

In Row B03, an explanatory sentence regarding a traveling speed is generated in S231.

In Row B04, an explanatory sentence regarding an acceleration and deceleration state is generated in S232.

In Row B05, an explanatory sentence regarding a steering state is generated in S233.

FIG. 17 is a table showing an instruction sentence to the large-scale language model unit 13 used in the traveling situation explanatory sentence generation process (S24).

An instruction to generate the traffic situation explanatory sentence is described in Row C01.

Information included in the traffic situation explanatory sentence is described in Row C02.

Information excluded from the traffic situation explanatory sentence is described in Row C03.

An example sentence of the traffic situation explanatory sentence is described in Row C04.

Then, in the traveling situation explanatory sentence generation process (S24), the explanatory sentence generation unit 12 generates a prompt that sequentially combines the following texts from (Item 1) to (Item 4). At least one of (Item 2) and (Item 3) may be omitted.

(Item 1) The instruction sentence to the large-scale language model unit 13 (FIG. 17)

(Item 2) The GPS explanatory sentence (Row B01 and Row B02 in FIG. 16)

(Item 3) The control explanatory sentence (Row B03, Row B04, and Row B05 in FIG. 16)

(Item 4) The image explanatory sentence (FIG. 13)

When the generated prompt is input to the large-scale language model unit 13, the explanatory sentence generation unit 12 acquires a traffic situation explanatory sentence described in a natural sentence. Hereinafter, the traffic situation explanatory sentence (corresponding to a situation explanatory sentence 732 in FIG. 21 to be described later) generated by the large-scale language model unit 13 from the prompt is exemplified.

Traffic situation explanatory sentence="It's noon, and you're traveling straight down on the Metropolitan Expressway No. 5 while slowing down at a tremendous speed. In this scene, there is an orange solid lane on the expressway. Further, a white truck is driving forward on the road in front."

Accordingly, the search accuracy for the search sentence by the user is improved by generating a natural traffic situation explanatory sentence according to a use purpose and preference of the user.

FIG. 18 is a table showing an example of the image explanatory sentence generated from an image different from that in FIG. 13.

An image explanatory sentence in FIG. 18 is intended for an image captured from a vehicle that travels on a general road. Therefore, since a combination of the general road and the pedestrian in the necessity table 14A "requires" an explanation, information indicating that "pedestrian is not recognized" is described in Row D07.

A traffic situation explanatory sentence generated by the large-scale language model unit 13 by the traveling situation explanatory sentence generation process (S24) from a prompt including the image explanatory sentence in FIG. 18 is as follows.

Traffic situation explanatory sentence="You are currently traveling at a slow and steady speed on a city road in Mito City at night, and preparing to turn left. In this scene, the pedestrian is not present."

Creating a database of the traveling situation explanatory sentence (the process until storage in the explanatory sentence DB 15) has been described above with reference up to FIG. 18. Hereinafter, an example of utilizing databased information will be explained.

FIG. 19 is a flowchart showing a process of the search unit 16.

The search unit 16 searches images stored in the explanatory sentence DB 15 for an image matching a received search sentence. Specifically, the search unit 16 outputs images having a high similarity between the received search sentence and a situation explanatory sentence stored in the explanatory sentence DB 15 as a search result.

The search unit 16 may, for example, list images in a descending order of similarity of a search result and output the images from the first rank to the X-th rank (similarity determination in a relatively descending order), or may output images of a search result having a similarity higher than a preset reference value (threshold Y) (absolute similarity determination) as the "images having a high similarity".

Hereinafter, details of the process of the search unit 16 will be explained.

The search unit 16 receives a search sentence input by the user via the input and output unit 17 (S61). The user here is, for example, a presenter at a traffic control center that manages an expressway or the like. The search sentence is, for example, a content indicating that an image of a situation similar to an accident that occurs at a predetermined location on an expressway at a predetermined time point is collected from a database. The presenter plans to edit an image material acquired from the database and produce a news program about the accident that has occurred.

The search unit 16 evaluates a similarity between the search sentence from the user and an explanatory sentence stored in the explanatory sentence DB 15 (S62), and acquires video information (image information) associated with an explanatory sentence having a high similarity from the explanatory sentence DB 15. For the similarity evaluation, cosine similarity search based on document vectorization or the like may be used.

In addition to the traveling video and the traveling situation explanatory sentence acquired in S62, the search unit 16 searches for and acquires related information on the traveling situation (weather information that is not present in the explanatory sentence DB 15 but can be acquired from a weather database by designating a location and date and time of a traveling situation explanatory sentence, or the like), and generates an answer sentence based on these results (S63).

That is, the search unit 16 may also output, as a search result, related information acquired from a database different from the explanatory sentence DB 15 based on information included in a situation explanatory sentence corresponding to the image having a high similarity.

The search unit 16 transmits the answer sentence in S63 to the input and output unit 17 (S64).

Accordingly, when searching for video data including a traffic situation explanatory sentence similar to a search sentence in a natural language input by the user, a target video can be found in a short time.

Figure 20:
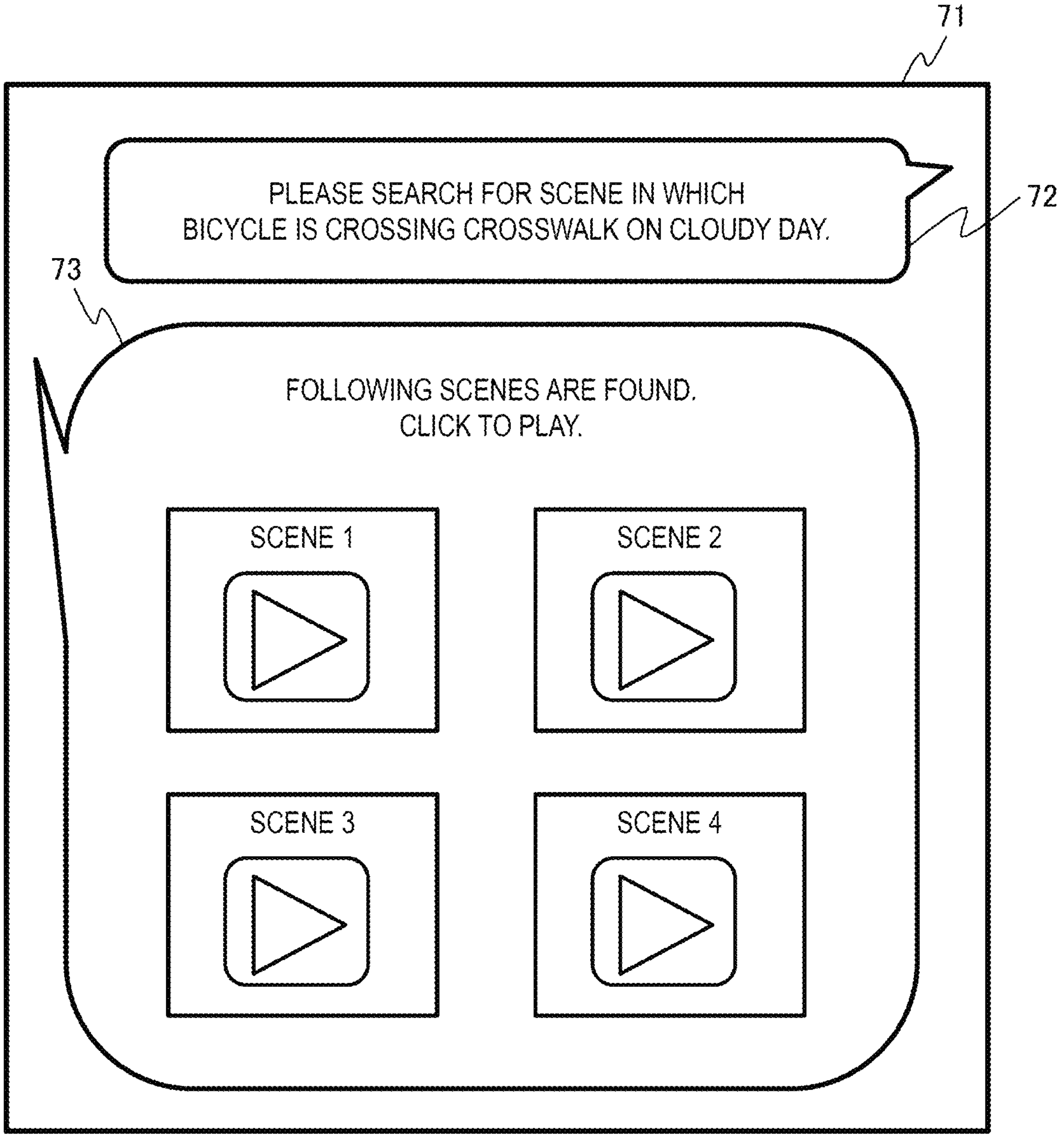
FIG. 20 is a diagram showing an image search interface of an input and output unit according to the present embodiment.

FIG. 20 is a diagram showing an image search interface 71 of the input and output unit 17.

The image search interface 71 includes a search sentence input part 72 that is an input field of the search sentence in S61, and a search result display part 73 that is a display field of the answer sentence in S64. In the search result display part 73, a plurality of search results (Scenes 1 to 4) are displayed as icons or thumbnail images.

Figure 21:
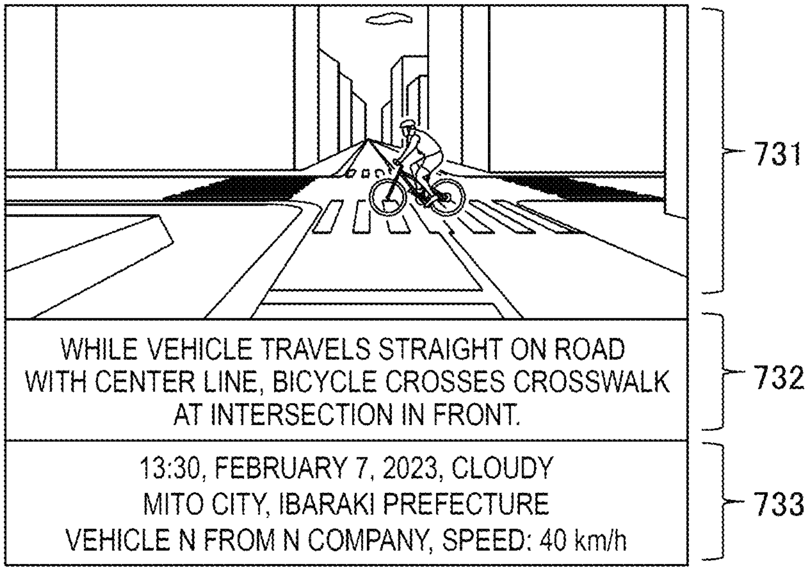
FIG. 21 shows a play screen when a search result (Scene 1) in FIG. 20 according to the present embodiment is clicked.

FIG. 21 shows a play screen when the search result (Scene 1) in FIG. 20 is clicked. On the play screen, the following information is displayed sequentially from the top.

An image 731 as a search result.

The situation explanatory sentence 732 of the image 731 is extracted as a situation explanatory sentence having a high similarity to a search sentence.

Additional information 733 such as the GPS explanatory sentence (time point and location), the control explanatory sentence (vehicle type and traveling speed), and weather.

Figure 22:
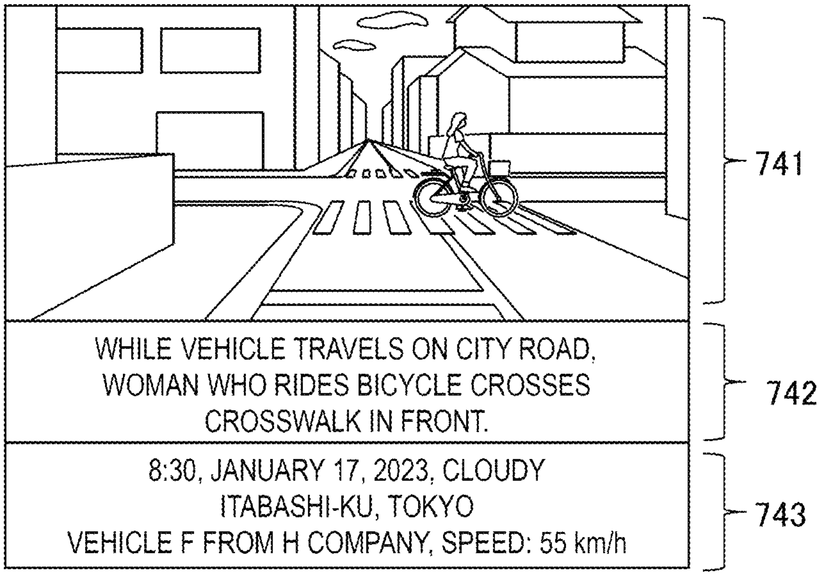
FIG. 22 is a play screen when a search result (Scene 2) in FIG. 20 according to the present embodiment is clicked.

FIG. 22 shows a play screen when the search result (Scene 2) in FIG. 20 is clicked. Similar to FIG. 21, an image 741 of a search result, a situation explanatory sentence 742 thereof, and additional information 743 are displayed on the play screen in a similar manner as in FIG. 21.

Accordingly, after the user inputs a search sentence in a natural language, it is possible to improve search efficiency by searching for a video with reference to a traffic situation explanatory sentence and a video similar to the search sentence as well as related information.

According to the present embodiment described above, when generating an explanatory sentence of a vehicle image, the explanatory sentence generation unit 12 refers to the necessity table 14A, and generates a natural explanatory sentence including presence or absence of a surrounding object to be focused on based on a traffic scene in which the vehicle is placed. Accordingly, since a natural explanatory sentence that mentions a necessary surrounding object but does not mention an unnecessary surrounding object is compiled into a database, search accuracy in the database based on a search sentence input by a human is improved.

Further, the invention is not limited to the embodiment described above, and it goes without saying that various other applications and modifications can be made without departing from the gist of the invention as set forth in the claims. For example, the embodiment described above explains the configuration of the vehicle image analysis device 1 in detail and specifically in order to explain the invention in an easy-to-understand manner, and is not necessarily limited to including all the explained components. In addition, a part of a configuration of a certain embodiment can be replaced with a component of another embodiment. In addition, a component of another embodiment can also be added to a configuration of a certain embodiment. In addition, addition, replacement, or deletion of another component can also be made to a part of a configuration of the embodiment.

Some or all of the configurations, the functions, the processing units, and the like described above may be implemented by hardware by, for example, performing design with an integrated circuit. As the hardware, a processor device in a broad sense such as a field programmable gate array (FPGA) or an application specific integrated circuit (ASIC) may be used.

In addition, each component of the vehicle image analysis device 1 according to the embodiment described above may be mounted on any hardware as long as the hardware can transmit and receive information to and from each other via a network. In addition, a process executed by a certain processing unit may be implemented by one piece of hardware, or may be implemented by a distributed process by a plurality of pieces of hardware.

What is claimed is:

1. An explanation generating system that enables retrieval of an image by a natural-language search using a situation explanatory sentence, the explanation generating system comprising:

a database configured to store situation explanatory sentences in association with images and to be searched by a worker in natural language; and a processor configured to store a sentence in said database, wherein said processor:

receives scene information indicating a scene recognized by a generative model which can analyze an image from a camera and output in natural language;

inputs a prompt to said generative model, wherein said prompt corresponds to said scene information and said prompt is generated based on explanation necessity of an object set for each scene;

receives a situation explanatory sentence generated by said generative model according to said prompt; and associates said situation explanatory sentence with said image, and stores said situation explanatory sentence in said database.

2. The explanation generating system according to claim 1 wherein said generative model includes a language model.

3. The explanation generating system according to claim 1 wherein said prompt is generated based on said explanation necessity and recognition necessity.

4. The explanation generating system according to claim 1 wherein said prompt includes an image explanatory sentence.

5. The explanation generating system according to claim 1 wherein said prompt includes a control explanatory sentence.

6. The explanation generating system according to claim 1 wherein said prompt includes a GPS explanatory sentence.

7. The explanation generating system according to claim 2 wherein said prompt is generated based on said explanation necessity and recognition necessity.

8. The explanation generating system according to claim 7 wherein said prompt includes an image explanatory sentence.

9. The explanation generating system according to claim 8 wherein said prompt includes a control explanatory sentence.

10. The explanation generating system according to claim 9 wherein said prompt includes a GPS explanatory sentence.

11. A production method of a database that enables retrieval of an image by a natural-language search using a situation explanatory sentence, production method comprising:

receiving scene information indicating a scene recognized by a generative model which can analyze an image from a camera and output in natural language;

inputting a prompt to said generative model, wherein said prompt corresponds to said scene information and said prompt is generated based on explanation necessity of an object set for each scene;

receiving a situation explanatory sentence generated by said generative model according to said prompt; and associating said situation explanatory sentence with said image, storing said situation explanatory sentence in the database.

12. The production method according to claim 11 wherein said generative model includes a language model.

13. The production method according to claim 11 wherein said prompt is generated based on said explanation necessity and recognition necessity.

14. The production method according to claim 11 wherein said prompt includes an image explanatory sentence.

15. The production method according to claim 11 wherein said prompt includes a control explanatory sentence.

16. The production method according to claim 11 wherein said prompt includes a GPS explanatory sentence.

17. The production method according to claim 12 wherein said prompt is generated based on said explanation necessity and recognition necessity.

18. The production method according to claim 17 wherein said prompt includes an image explanatory sentence.

19. The production method according to claim 18 wherein said prompt includes a control explanatory sentence.

20. The production method according to claim 19 wherein said prompt includes a GPS explanatory sentence.

* * * * *